US007289559B2

(12) United States Patent
Chen et al.

(10) Patent No.: US 7,289,559 B2
(45) Date of Patent: Oct. 30, 2007

(54) METHOD FOR UPDATING COEFFICIENTS IN DECISION FEEDBACK EQUALIZER

(75) Inventors: Tien-Hui Chen, Taipei (TW); Chingwo Ma, Danville, CA (US); Jeff Lin, Taipei (TW); Kai-Pon Kao, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 816 days.

(21) Appl. No.: 10/665,462

(22) Filed: Sep. 22, 2003

(65) Prior Publication Data

US 2005/0063498 A1    Mar. 24, 2005

(51) Int. Cl.
*H03H 7/30* (2006.01)
(52) U.S. Cl. ...................... 375/233; 375/348
(58) Field of Classification Search ............... 375/233, 375/348
See application file for complete search history.

(56) References Cited

U.S. PATENT DOCUMENTS 6,690,715 B2*    2/2004    Webster et al. ............. 375/148
7,113,553 B2*    9/2006    Chen et al. .................. 375/329
2004/0101068 A1*    5/2004    Wang et al. ................ 375/324
2004/0146129 A1*    7/2004    Lin ............................ 375/348

OTHER PUBLICATIONS

Inkyu, "A fast computation algorithm for the decision feedback equalizer", IEEE Transactions on Communications, Nov. 1995 vol. 43, issue: 11, pp. 2742-2749.*

* cited by examiner

*Primary Examiner*—Temesghen Ghebretinsae
*Assistant Examiner*—Juan Alberto Torres
(74) *Attorney, Agent, or Firm*—Rabin & Berdo, P.C.

(57) ABSTRACT

A method for updating coefficients in a decision feedback equalizer (DFE). The DFE comprises an ISI canceler for canceling inter-symbol interference (ISI) from a plurality of first signals received from a channel. A first symbol comprising a set of the first signals is decoded to generate a decoded symbol. Then, a vector of error values computed as the difference between the decoded symbol, and the first symbol is obtained. According to the decoded symbol and the vector of the error values, a temp matrix is generated. Next, the values of the elements in every diagonal line of the temp matrix are averaged. Finally, the coefficients are updated by the Toeplitz Matrix.

9 Claims, 3 Drawing Sheets

METHOD FOR UPDATING COEFFICIENTS IN DECISION FEEDBACK EQUALIZER

BACKGROUND OF THE INVENTION

1. Field of the Invention

The present invention relates to a decision feedback equalizer and particularly to a method for generating a Toeplitz matrix in a decision feedback equalizer to reduce inter-chip interference (ICI) and inter-symbol interference (ISI).

2. Description of the Related Art

Wireless communication channels often suffer from severe inter-chip interference (ICI), inter-symbol interference (ISI), and multi-path fading effect. Channel equalization is essential to combat channel distortion caused by the above, so that symbols can be correctly determined at the receiving end. Channel equalization can be performed either on a chip basis or on a sample basis. In chip based equalization, the equalizer coefficients are updated on every received chip. Decision feedback equalizer (DFE) using the least mean-squared (LMS) algorithm is a well-known equalization technique for magnetic storage and digital communication. The basic block diagram of traditional DFE is depicted in FIG. 1, where DFE is composed of two main finite impulse response (FIR) filters, the feedforward filter (FFF) 102 and the feedback filter (FBF) 104. The outputs from both filters are added and fed into a slicer 106. The signal output from the slicer 106 is the final equalized data. The basic function of FFF 102 and FBF 104 is to cancel the pre-cursor and post-cursor inter-chip interference (ICI) respectively, while the WUC 108 and WUD 110 in the figure stand for the weight-update blocks for the FFF 102 and the FBF 104.

DFE in the chip-base helps alleviate ICI. ISI, however, cannot be completely cancelled with this type of DFE. Thus, a DFE that reduces ISI and ICI simultaneously is desirable.

SUMMARY OF THE INVENTION

The object of the present invention is to provide a method for generating a Toeplitz matrix in a decision feedback equalizer (DFE). A DFE of this type is then capable of reducing inter-symbol interference (ISI) and inter-chip interference (ICI) simultaneously.

The present invention provides a method for updating coefficients in a decision feedback equalizer (DFE). The DFE comprises an ISI canceler for canceling a ISI from a plurality of first signals received from a channel. A first symbol comprising a set of the first signals is decoded to generate a decoded symbol. Then, a vector of error values computed as the difference between the decoded symbol, and the first symbol is obtained. According to the decoded symbol and the vector of the error values, a temp matrix is generated. Next, the values of the elements in every diagonal line of the temp matrix are averaged. Finally, the coefficients are updated by the Toeplitz Matrix.

The present invention also provides a decision feedback equalizer (DFE). The DFE comprises an ICI canceler and an ISI canceler. The ICI canceler cancels ICI from a signal received from a channel and outputs a first signal without ICI. The ISI canceler comprises a symbol decoder and a symbol-base feedback filter with a plurality of coefficients. A first symbol comprising a set of the first signals is decoded by the symbol decoder. The symbol-base feedback filter transforms the decoded symbol by a Toeplitz Matrix to cancel ISI from the present decoded symbol, and generates an output signal. The Toeplitz Matrix is generated by the above method.

BRIEF DESCRIPTION OF THE DRAWINGS

The present invention will become more fully understood from the detailed description given hereinbelow and the thus not intended to be limitative of the present invention.

DETAILED DESCRIPTION OF THE INVENTION

Figure 1:
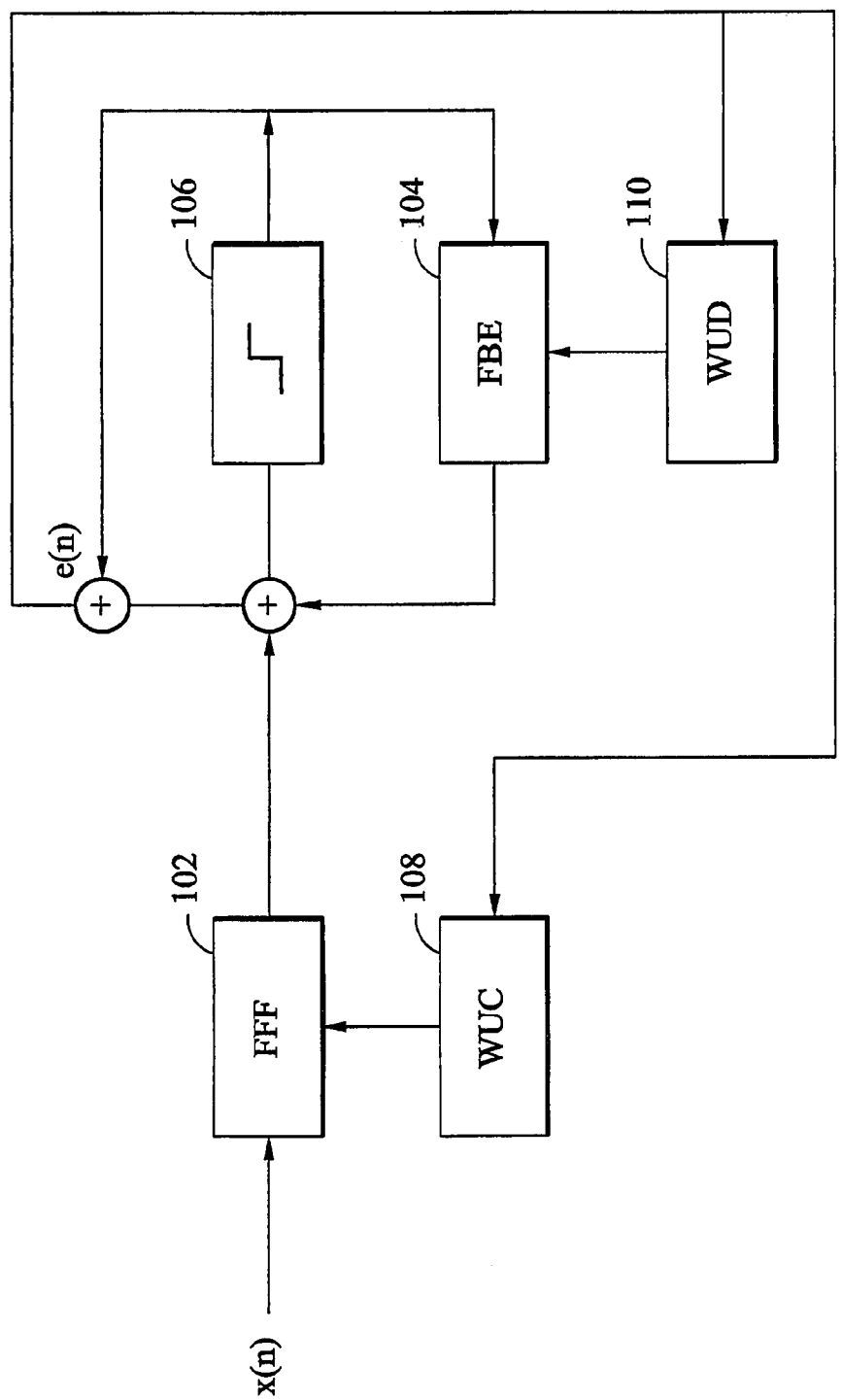
FIG. 1 is a block diagram illustrating a configuration of a traditional DFE.
Figure 2:
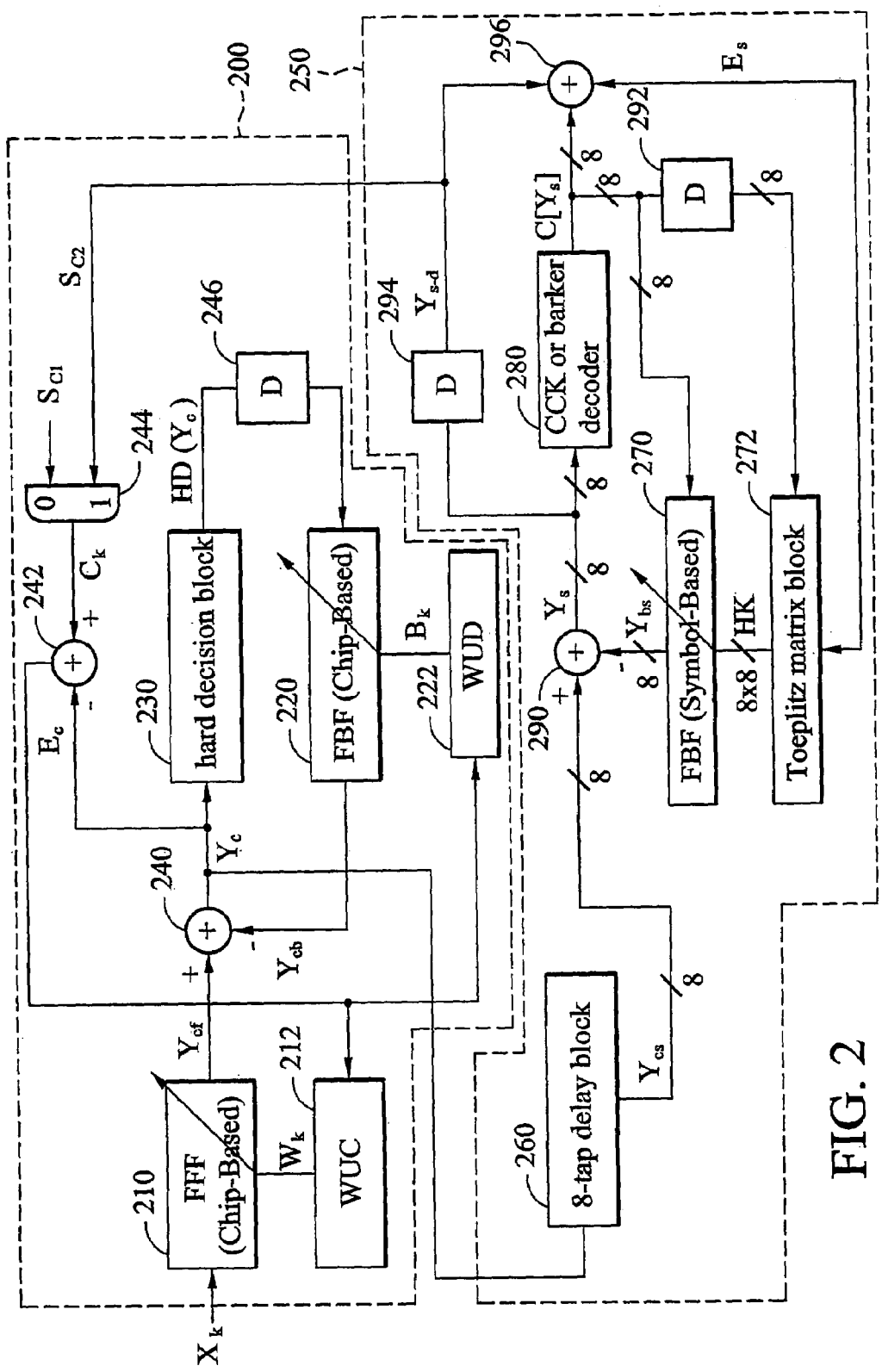
FIG. 2 is a block diagram illustrating a configuration of a DFE according to the first embodiment of the present invention.

FIG. 2 is a block diagram illustrating a configuration of a DFE according to the first embodiment of the present invention. The DFE comprises an inter-chip interference (ICI) canceler 200 and an inter-symbol interference (ISI) canceler 250. A signal $X_k(n)$ received from a channel is input to the ICI canceler 200.

The ICI canceler 200 is composed of two main chip-base finite impulse response (FIR) filters, the feedforward filter (FFF) 210 and the feedback filter (FBF) 220. The basic function of FFF 210 and FBF 220 is to cancel the pre-cursor and post-cursor inter-chip interference (ICI) respectively. The FFF 210 and FBF 220 adapt the tap weights to compensate for ICI and other sources of signal degradation and distortion.

The outputs from both filters $Y_{cf}$ and $Y_{cb}$ are added by an adder 240 to become input data $Y_c$. The input data $Y_c$ is fed into a hard decision block 230. Then, the hard decision block 230 produces equalized data $HD(Y_c)$. After a one-tap delay block 246, the equalized data $HD(Y_c)$ is fed into FBF 220.

On the other hand, an error $E_c$ from an adder 242 defines a vector of error values computed as the difference between an output $C_k$ of a multiplexer 244 and the input data $Y_c$. In the embodiment, the DFE can operate in a barker mode or a complementary code keying (CCK) mode. The operating mode can be selected by control signals $S_{c1}$ and $S_{c2}$ input to the multiplexer 244.

Then, the error $E_c$ is fed back to the FFF 210 and FBF 220 to adapt the tap weights. The WUC 212 and WUD 222 in the figure stand for the weight-update blocks for the FFF 210 and the FBF 220.

In this embodiment of the invention, the WUC 212 and WUD 222 use Least-Mean-Square (LMS) to adapt the tap weights as is shown in the following example.

For the Barker mode, the adaptive algorithm is:

$$W_k(n+1)=W_k(n)+\mathfrak{i}^*\mathrm{conj}(E_c(n))^*X(n-k), k=0,1,\ldots,N; \quad (1)$$

where $W_k(n+1)$ is the vector set formed by the tap weights $W_1, W_2, \ldots, W_N$ in the FFF 210 after a period of time, i.e. the vector set formed by the adjusted tap weights;

$W(n)$ is the vector set formed by the tap weights $W_1, W_2, \ldots, W_N$ in the FFF 210 at a chip time n; and $\mathfrak{i}$ is the learning constant.

$$B_k(n+1)=B_k(n)+\mathfrak{i}^*\mathrm{conj}(E_c(n))^*Bk[Y_c(n-k)], \\ k=0,1,\ldots,M; \quad (2)$$

where $B_k(n+1)$ is the vector set formed by the tap weights $B_1, W_2, \ldots, B_M$ in the FBF 220 after a period of time, i.e. the vector set formed by the adjusted tap weights;

$B_k(n)$ is the vector set formed by the tap weights $W_1, W_2, \ldots, W_N$ in the FBF 220 at a chip time n; and $\mathfrak{i}$ is the learning constant.

The input data $Y_c(n)$ fed into a hard decision block 230 is:

$$Y_c(n) = \sum_{k=0}^{N} X_k(n-k)conj(W_k) - \sum_{k=0}^{M} HD[Y_c(n-k-1)]_k conj(B_k) \quad (3)$$

The error $E_c(n)$ is:

$$E_c(n) = C_k(n) - Y_c(n) \quad (4)$$

For the CCK mode, the adaptive algorithm is:

$$W_k(n+1) = W_k(n) + \mathbf{i}^* conj(E_c(n-16))^* X(n-k-16), \\ k=0,1,\ldots,N; \quad (5)$$

where $W_k(n+1)$ is the vector set formed by the tap weights $W_1, W_2, \ldots, W_N$ in the FFF 210 after a period of time, i.e. the vector set formed by the adjusted tap weights;

W(n) is the vector set formed by the tap weights $W_1, W_2, \ldots, W_N$ in the FFF 210; and ɨ is the learning constant.

$$B_k(n+1) = B_k(n) + \mathbf{i}^* conj(E_c(n-16))^* Bk[Y_c(n-k-17)], \\ k=0,1,\ldots,M; \quad (6)$$

where $B_k(n+1)$ is the vector set formed by the tap weights $B_1, W_2, \ldots, B_M$ in the FBF 220 after a period of time, i.e. the vector set formed by the adjusted tap weights;

$B_k(n)$ is the vector set formed by the tap weights $W_1, W_2, \ldots, W_N$ in the FBF 220; and ɨ is the learning constant.

The input data $Y_c(n)$ fed into a hard decision block 230 is:

$$Y_c(n) = \sum_{k=0}^{N} X_k(n-k)conj(W_k) - \sum_{k=0}^{M} HD[Y_c(n-k-1)]_k conj(B_k) \quad (7)$$

The error $E_c(n)$ is:

$$E_c(n-16) = C_k(n-16) - Y_c(n-16) \quad (8)$$

After a symbol time delay block, which is 8-tap delay block 260 in the embodiment, a symbol $Y_{cs}$ which comprises eight input data $Y_c$ is fed in to an adder 290. The ISI canceler 250 is composed from a symbol-based feedback filter (FBF) 270 and a CCK or barker decoder 280. The symbol-based FBF 270 adapts the tap weights to compensate for ISI generated by the last symbol. The outputs from the symbol-based FBF 270 $Y_{bs}$ and the symbol $Y_{cs}$ are added by an adder 290 to become an input symbol $Y_s$.

The input symbol $Y_s$ is fed into the CCK or barker decoder 280. Then, the CCK or barker decoder 280 produces a decoded symbol $C(Y_s)$. An error $E_s$ from an adder 296 defines a vector of error values computed as the difference between the decoded symbol $C(Y_s)$ and the input symbol $Y_s$ after a one-tap delay block 294.

Then, the error $E_s$ and the input symbol $Y_s$ after a one-tap delay block 292 is input to a Toeplitz matrix block 272. The TMB 272 in the figure stands for the coefficient-update block for the symbol-based FBF 270.

In this embodiment of the invention, the TMB 272 uses Least-Mean-Square (LMS) to adapt the tap weights, for example.

The adaptive algorithm is:

$$H(m+1) = H(m) + \mu T\{conj(E(m)) \cdot C(m+1)\}; \quad (9)$$

where H(m) is coefficients at a symbol time m;

H(m+1) is coefficients at a symbol time (m+1);

μ is a predetermined gain;

T is a Toeplitz Matrix;

E(m) is the vector of error values; and

C(m+1) is the decoded symbol at the symbol time (m+1).

The symbol $Y_{cs}(m)$ which comprises eight input data $Y_c(n-7)$, $Y_c(n-6)$, $Y_c(n-5)$, $Y_c(n-4)$, $Y_c(n-3)$, $Y_c(n-3)$, $Y_c(n-1)$, $Y_c(n)$ is take as an example, where m is a symbol time and a natural number, and n=8×m. The algorithm to compensate for ISI generated by the last symbol $C(Y_s(m-1))$ is:

$$\begin{aligned} Y_s(m) &= Y_{cs}(m) - C(Y_s(m-1)) \cdot H(m) \quad (10) \\ &= Y_{cs}(m) - [C(n-15)\ C(n-14)\ C(n-13)\ C(n-12) \\ &\quad C(n-11)\ C(n-10)\ C(n-9)\ C(n-8)] \cdot H(m) \end{aligned}$$

The following illustrates how the Toeplitz Matrix in the TMB 272 is generated.

First, the symbol $Y_{cs}(m)$ which comprises input data $Y_c(n-7)$, $Y_c(n-6)$, $Y_c(n-5)$, $Y_c(n-4)$, $Y_c(n-3)$, $Y_c(n-3)$, $Y_c(n-1)$, $Y_c(n)$ is decoded to generate a decoded symbol $C(Y_{cs}(m))$.

An error $E_s(m)$ defines a vector of error values computed as the difference between the decoded symbol $C(Y_{cs}(m))$ and the input symbol $Y_{cs}(m)$ after a one-tap delay block 294. Then, according to the decoded symbol $C(Y_{cs}(m))$ and the vector of the error values $E_s(m)$, a temp Matrix $$T(m) \begin{bmatrix} h_{11} & h_{12} & \cdots & \cdots & h_{18} \\ h_{21} & h_{22} & \cdots & \cdots & h_{28} \\ \vdots & \vdots & \vdots & \vdots & \vdots \\ h_{71} & h_{72} & \cdots & \cdots & h_{78} \\ h_{81} & h_{82} & \cdots & \cdots & h_{88} \end{bmatrix}$$

is generated. The temp Matrix T(m) is:

$$T(m) = \begin{bmatrix} E^*(n-7)\cdot C(n-7) & E^*(n-7)\cdot C(n-6) & \cdots & \cdots & E(n-7)\cdot C(n) \\ E^*(n-6)\cdot C(n-7) & E^*(n-6)\cdot C(n-6) & \cdots & \cdots & E^*(n-6)\cdot C(n) \\ \vdots & \vdots & \vdots & \vdots & \vdots \\ E^*(n-1)\cdot C(n-7) & E^*(n-1)\cdot C(n-6) & \cdots & \cdots & E^*(n-1)\cdot C(n) \\ E^*(n)\cdot C(n-7) & E^*(n)\cdot C(n-6) & \cdots & \cdots & E^*(n)\cdot C(n) \end{bmatrix};$$

where E(n) is a vector of error values at the chip time n and C(n) is the chip of the decoded symbol at the chip time n.

If the channel is steady, such as the DFE design for wireless communication over mobile radio channel, the values of the elements in the diagonal lines of the temp Matrix are almost the same i.e. $h_{11} = h_{22} = \ldots = h_{88}$, $h_{21} = h_{32} = \ldots = h_{87}, \ldots, h_{71} = h_{82}$, $h_{12} = h_{23} = \ldots = h_{78}$, $h_{13} = h_{24} = \ldots = h_{77}, \ldots, h_{17} = h_{28}$.

Thus, for reducing noise, the values of the elements in every diagonal line of the temp matrix are averaged to generate a Toeplitz Matrix $$H(m)\begin{bmatrix} h_8 & h_9 & \cdots & \cdots & h_{15} \\ h_7 & h_8 & \cdots & \cdots & h_{14} \\ \vdots & \vdots & \vdots & \vdots & \vdots \\ h_2 & h_3 & \cdots & \cdots & h_9 \\ h_1 & h_2 & \cdots & \cdots & h_8 \end{bmatrix}.$$

The Toeplitz Matrix $$H(m) = \begin{bmatrix} \left(\sum_{i=0}^{7} E^*(n-i)\cdot C(n-i)\right)/8 & \left(\sum_{i=0}^{6} E^*(n-(i+1))\cdot C(n-i)\right)/7 & \cdots & \cdots & E^*(n-7)\cdot C(n) \\ \left(\sum_{i=0}^{6} E^*(n-i)\cdot C(n-(i+1))\right)/7 & \left(\sum_{i=0}^{7} E^*(n-i)\cdot C(n-i)\right)/8 & \cdots & \cdots & \left(\sum_{i=0}^{1} E^*(n-(i+6))\cdot C(n-i)\right)/2 \\ \vdots & \vdots & \vdots & \vdots & \vdots \\ \left(\sum_{i=0}^{1} E^*(n-i)\cdot C(n-(i+6))\right)/2 & \left(\sum_{i=0}^{2} E^*(n-i)\cdot C(n-(i+5))\right)/3 & \cdots & \cdots & \left(\sum_{i=0}^{6} E^*(n-(i+1))\cdot C(n-i)\right)/7 \\ E^*(n)\cdot C(n-7) & \left(\sum_{i=0}^{1} E^*(n-i)\cdot C(n-(i+6))\right)/2 & \cdots & \cdots & \left(\sum_{i=0}^{7} E^*(n-i)\cdot C(n-i)\right)/8 \end{bmatrix}.$$

In addition, in the Toeplitz Matrix $$\begin{bmatrix} h_8 & h_9 & \cdots & \cdots & h_{15} \\ h_7 & h_8 & \cdots & \cdots & h_{14} \\ \vdots & \vdots & \vdots & \vdots & \vdots \\ h_2 & h_3 & \cdots & \cdots & h_9 \\ h_1 & h_2 & \cdots & \cdots & h_8 \end{bmatrix},$$

for any $15 \geq i > 8$, the $h_i \ldots h_{15}$ may be equal to 0, such as, if $h_9 \sim h_{15}$ are small and can be ignored, the Toeplitz Matrix becomes $$\begin{bmatrix} h_8 & 0 & \cdots & \cdots & 0 \\ h_7 & h_8 & \cdots & \cdots & 0 \\ \vdots & \vdots & \vdots & \vdots & \vdots \\ h_2 & h_3 & \cdots & \cdots & 0 \\ h_1 & h_2 & \cdots & \cdots & h_8 \end{bmatrix}.$$

Thus, the Toeplitz Matrix $$H(m) = \begin{bmatrix} \left(\sum_{i=0}^{7} E^*(n-i)\cdot C(n-i)\right)/8 & 0 & \cdots & \cdots & 0 \\ \left(\sum_{i=0}^{6} E^*(n-i)\cdot C(n-(i+1))\right)/7 & \left(\sum_{i=0}^{7} E^*(n-i)\cdot C(n-i)\right)/8 & \cdots & \cdots & 0 \\ \vdots & \vdots & \vdots & \vdots & \vdots \\ \left(\sum_{i=0}^{1} E^*(n-i)\cdot C(n-(i+6))\right)/2 & \left(\sum_{i=0}^{2} E^*(n-i)\cdot C(n-(i+5))\right)/3 & \cdots & \cdots & 0 \\ E^*(n)\cdot C(n-7) & \left(\sum_{i=0}^{1} E^*(n-i)\cdot C(n-(i+6))\right)/2 & \cdots & \cdots & \left(\sum_{i=0}^{7} E^*(n-i)\cdot C(n-i)\right)/8 \end{bmatrix}.$$

Figure 3:
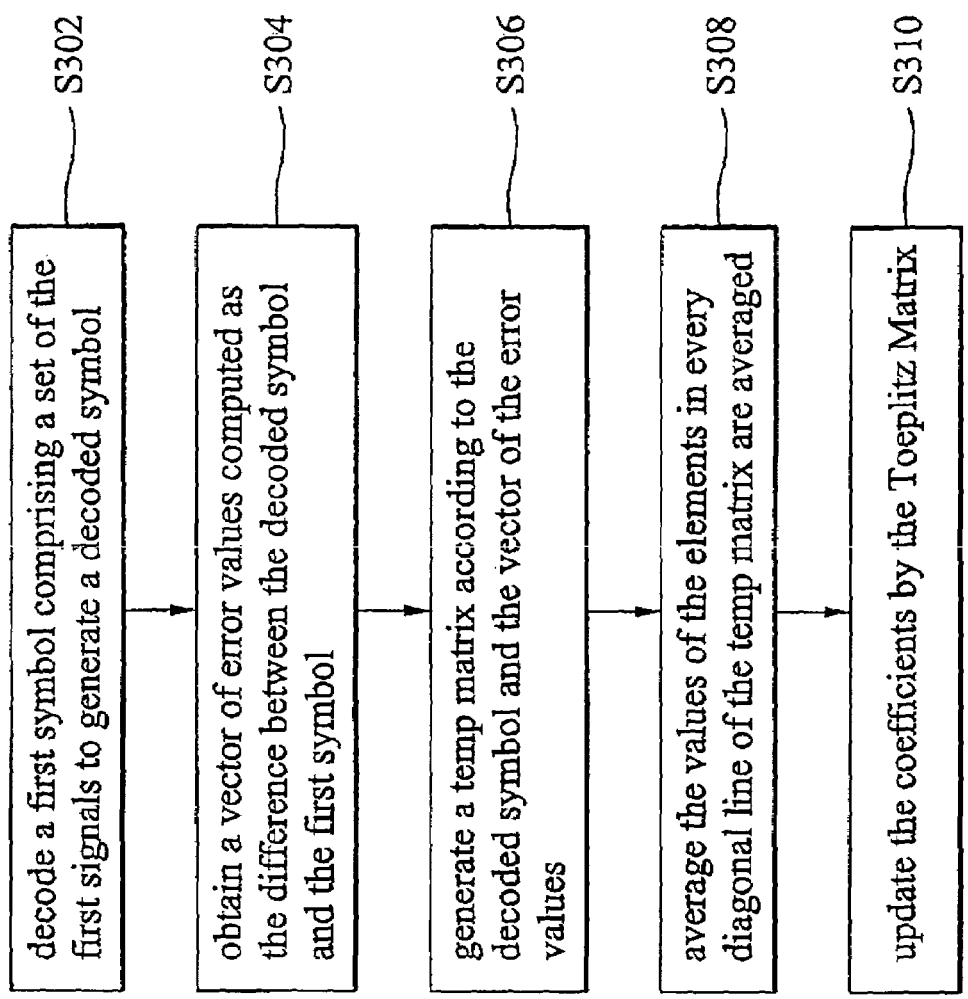
FIG. 3 is a flow chart illustrating the method for updating coefficients in the DFE according to the present invention.

In summary, the flow chart illustrating the method for updating coefficients in the DFE according to the present invention is shown in FIG. 3. First, a first symbol comprising a set of the first signals is decoded to generate a decoded symbol (S302). Then, a vector of error values computed as the difference between the decoded symbol, and the first symbol is obtained (S304). According to the decoded symbol and the vector of the error values, a temp matrix is generated (S306). Next, the values of the elements in every diagonal line of the temp matrix are averaged (S308). Finally, the coefficients are updated by the Toeplitz Matrix (S310).

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for updating coefficients in a decision feedback equalizer having an ISI canceller for canceling intersymbol interference (ISI) from a plurality of first signals received from a channel, the method comprising:

receiving the plurality of first signals having ISI;

decoding a first symbol comprising a set of the first signals having ISI to generate a decoded symbol having ISI, wherein the first symbol has (k+1) chips, and k is a natural number;

obtaining a vector of error values computed as the difference between the decoded symbol, and the first symbol;

generating a temp matrix according to the decoded symbol and the vector of the error values;

averaging the values of the elements in every diagonal line of the temp matrix to generate a Toeplitz Matrix;
updating the coefficients by the Toeplitz; and
canceling the ISI from the decoded symbol with the ISI canceller, using the updated coefficients.

2. The method as claimed in claim 1 further comprising:
updating coefficients according to a least mean square algorithm:

$$H(m+1)=H(m)+\mu T\{conj(E(m))\cdot C(m+1)\};$$

H(m) is coefficients at a symbol time m;
H(m+1) is coefficients at a symbol time (m+1);
$\mu$ is a predetermined gain;
T is the Toeplitz Matrix;
E(m) is the vector of error values; and
C(m+1) is the decoded symbol at the symbol time (m+1).

$$\begin{bmatrix} \left(\sum_{i=0}^{k} E^*(n-i)\cdot C(n-i)\right)/(k+1) & \left(\sum_{i=0}^{k-1} E^*(n-(i+1))\cdot C(n-i)\right)/k & \cdots & \cdots & E^*(n-k)\cdot C(n) \\ \left(\sum_{i=0}^{k-1} E^*(n-i)\cdot C(n-(i+1))\right)/k & \left(\sum_{i=0}^{k} E^*(n-i)\cdot C(n-i)\right)/(k+1) & \cdots & \cdots & \left(\sum_{i=0}^{k-(k-1)} E^*(n-(i+k-1))\cdot C(n-i)\right)/2 \\ \vdots & \vdots & \vdots & \vdots & \vdots \\ \left(\sum_{i=0}^{k-(k-1)} E^*(n-i)\cdot C(n-(i+k-1))\right)/2 & \left(\sum_{i=0}^{k-(k-2)} E^*(n-i)\cdot C(n-(i+k-2))\right)/3 & \cdots & \cdots & \left(\sum_{i=0}^{k-1} E^*(n-(i+1))\cdot C(n-i)\right)/k \\ E^*(n)\cdot C(n-k) & \left(\sum_{i=0}^{k-(k-1)} E^*(n-i)\cdot C(n-(i+k-1))\right)/2 & \cdots & \cdots & \left(\sum_{i=0}^{k} E^*(n-i)\cdot C(n-i)\right)/(k+1) \end{bmatrix}$$

3. The method as claimed in claim 1, wherein, in the Toeplitz Matrix $$\begin{bmatrix} h_{(k+1)} & h_{(k+2)} & \cdots & \cdots & h_{(2k+1)} \\ h_k & h_{(k+1)} & \cdots & \cdots & h_{2k} \\ \vdots & \vdots & \vdots & \vdots & \vdots \\ h_2 & h_3 & \cdots & \cdots & h_{(k+2)} \\ h_1 & h_2 & \cdots & \cdots & h_{(k+1)} \end{bmatrix},$$

for any $(2k+1)\geq i>(k+1)$, the $h_{(i)} \ldots h_{(2k+1)}$ are equal to 0.

4. A method for updating coefficients in a decision feedback equalizer having an ISI canceler for canceling intersymbol interference (ISI) from a plurality of first signals received from a channel, the method comprising:
receiving the plurality of first signals having ISI;
decoding a first symbol comprising a set of the first signals having ISI to generate a decoded symbol having ISI, wherein the first symbol has (k+1) chips, and k is a natural number;
obtaining a vector of error values computed as the difference between the decoded symbol, and the first symbol;
generating a temp matrix T(m) according to the decoded symbol and the vector of the error values, wherein T(m)=

$$\begin{bmatrix} E^*(n-k)\cdot C(n-k) & E^*(n-k)\cdot C(n-(k-1)) & \cdots & \cdots & E^*(n-k)\cdot C(n) \\ E^*(n-(k-1))\cdot C(n-k) & E^*(n-(k-1))\cdot C(n-(k-1)) & \cdots & \cdots & E^*(n-(k-1))\cdot C(n) \\ \vdots & \vdots & \vdots & \vdots & \vdots \\ E^*(n-1)\cdot C(n-k)) & E^*(n-1)\cdot C(n-(k-1)) & \cdots & \cdots & E^*(n-1)\cdot C(n) \\ E^*(n)\cdot C(n-k) & E^*(n)\cdot C(n-(k-1)) & \cdots & \cdots & E^*(n)\cdot C(n) \end{bmatrix},$$

where m is the symbol time of the first symbol, the chip times of the first symbol are from (n−k) to n, n and m are natural numbers and n=(k+1)m; E(n) is a vector of error values at the chip time n; and C(n) is the chip of the decoded symbol at the chip time n;
averaging the values of the elements in every diagonal line of the temp matrix to generate a Toeplitz Matrix $$\begin{bmatrix} h_{(k+1)} & h_{(k+2)} & \cdots & \cdots & h_{(2k+1)} \\ h_k & h_{(k+1)} & \cdots & \cdots & h_{2k} \\ \vdots & \vdots & \vdots & \vdots & \vdots \\ h_2 & h_3 & \cdots & \cdots & h_{(k+2)} \\ h_1 & h_2 & \cdots & \cdots & h_{(k+1)} \end{bmatrix},$$

wherein H(m)= where H(m) is the Toeplitz Matrix at the symbol time m;
updating the coefficients by the Toeplitz Matrix; and
canceling the ISI from the decoded symbol with the ISI canceler, using the updated coefficients;
wherein the coefficients are updated according to a least mean square algorithm:

$$H(m+1)=H(m)+\mu T\{conj(E(m))\cdot C(m+1)\};$$

H(m) is coefficients at a symbol time m;
H(m+1) is coefficients at a symbol time (m+1);
$\mu$ is a predetermined gain;
T is the Toeplitz Matrix;
E(m) is the vector of error values; and
C(m+1) is the decoded symbol at the symbol time (m+1).

5. The method as claimed in claim 4, wherein, in the Toeplitz Matrix $$\begin{bmatrix} h_{(k+1)} & h_{(k+2)} & \cdots & \cdots & h_{(2k+1)} \\ h_k & h_{(k+1)} & \cdots & \cdots & h_{2k} \\ \vdots & \vdots & \vdots & \vdots & \vdots \\ h_2 & h_3 & \cdots & \cdots & h_{(k+2)} \\ h_1 & h_2 & \cdots & \cdots & h_{(k+1)} \end{bmatrix},$$

for any $(2k+1)\geq i>(k+1)$, the $h_{(i)} \ldots h_{(2k+1)}$ are equal to 0.

6. A decision feedback equalizer, comprising:
an ICI canceler for canceling inter-chip interference (ICI) from a signal received from a channel and outputting a first signal without ICI; and
an ISI canceler, comprising:
  a symbol decoder for decoding a first symbol comprising a set of the first signals to generate a decoded symbol; and
  a symbol-base feedback filter with a plurality coefficients for transforming the decoded symbol by a Toeplitz Matrix H(m) to cancel inter-symbol interference (ISI) from the present decoded symbol, and generating an output signal;
  wherein the first symbol has (k+1) chips, the Toeplitz Matrix is a (k+1)*(k+1) matrix, m is the symbol time of the first symbol, the chip times of the first symbol are from (n−k) to n, n, k and m are natural numbers and n=(k+1)m;

$$H(m) = \begin{bmatrix} \left(\sum_{i=0}^{k} E^*(n-i)\cdot C(n-i)\right)/(k+1) & \left(\sum_{i=0}^{k-1} E^*(n-(i+1))\cdot C(n-i)\right)/k & \cdots & \cdots & E^*(n-k)\cdot C(n) \\ \left(\sum_{i=0}^{k-1} E^*(n-i)\cdot C(n-(i+1))\right)/k & \left(\sum_{i=0}^{k} E^*(n-i)\cdot C(n-i)\right)/(k+1) & \cdots & \cdots & \left(\sum_{i=0}^{k-(k-1)} E^*(n-(i+k-1))\cdot C(n-i)\right)/2 \\ \vdots & \vdots & \vdots & \vdots & \vdots \\ \left(\sum_{i=0}^{k-(k-1)} E^*(n-i)\cdot C(n-(i+k-1))\right)/2 & \left(\sum_{i=0}^{k-(k-2)} E^*(n-i)\cdot C(n-(i+k-2))\right)/3 & \cdots & \cdots & \left(\sum_{i=0}^{k-1} E^*(n-(i+1))\cdot C(n-i)\right)/k \\ E^*(n)\cdot C(n-k) & \left(\sum_{i=0}^{k-(k-1)} E^*(n-i)\cdot C(n-(i+k-1))\right)/2 & \cdots & \cdots & \left(\sum_{i=0}^{k} E^*(n-i)\cdot C(n-i)\right)/(k+1) \end{bmatrix}$$

at the symbol time m is $$\begin{bmatrix} E^*(n-k)\cdot C(n-k) & E^*(n-k)\cdot C(n-(k-1)) & \cdots & \cdots & E^*(n-k)\cdot C(n) \\ E^*(n-(k-1))\cdot C(n-k) & E^*(n-(k-1))\cdot C(n-(k-1)) & \cdots & \cdots & E^*(n-(k-1))\cdot C(n) \\ \vdots & \vdots & \vdots & \vdots & \vdots \\ E^*(n-1)\cdot C(n-k)) & E^*(n-1)\cdot C(n-(k-1)) & \cdots & \cdots & E^*(n-1)\cdot C(n) \\ E^*(n)\cdot C(n-k) & E^*(n)\cdot C(n-(k-1)) & \cdots & \cdots & E^*(n)\cdot C(n) \end{bmatrix}, \text{ and}$$

where E(n) is a vector of error values computed as the difference between the chip of the decoded symbol at the chip time n, and the chip input to the symbol decoder at the chip time n, and C(n) is the chip of the decoded symbol at the chip time n.

7. The decision feedback equalizer as claimed in claim 6, wherein the coefficients are updated according to a least mean square algorithm:

$$H(m+1) = H(m) + \mu T\{conj(E(m))\cdot C(m+1)\};$$

H(m) is coefficients at a symbol time m;

H(m+1) is coefficients at a symbol time (m+1);

μ is a predetermined gain;

T { } is the Toeplitz Matrix;

E(m) is the vector of error values; and

C(m+1) is the decoded symbol at the symbol time (m+1).

8. The decision feedback equalizer as claimed in claim 6, wherein the Toeplitz Matrix $$\begin{bmatrix} h_{(k+1)} & h_{(k+2)} & \cdots & \cdots & h_{(2k+1)} \\ h_k & h_{(k+1)} & \cdots & \cdots & h_{2k} \\ \vdots & \vdots & \vdots & \vdots & \vdots \\ h_2 & h_3 & \cdots & \cdots & h_{(k+2)} \\ h_1 & h_2 & \cdots & \cdots & h_{(k+1)} \end{bmatrix}$$

when the channel is steady, the values of the elements in the diagonal lines of the Toeplitz Matrix are almost the same, $h_{11}=h_{22}=\ldots=h_{(k+1)\,(k+1)}$, $h_{21}=h_{32}=\ldots=h_{(k+1)k}$, $\ldots$, $h_{k1}=h_{(k+1)2}$, $h_{12}=h_{23}=\ldots=h_{k(k+1)}$, $h_{13}=h_{24}=\ldots=h_{kk}$, $\ldots$, $h_{1k}=h_{2(k+1)}$.

9. The decision feedback equalizer as claimed in claim 7, wherein, in the Toeplitz Matrix $$\begin{bmatrix} h_{(k+1)} & h_{(k+2)} & \cdots & \cdots & h_{(2k+1)} \\ h_k & h_{(k+1)} & \cdots & \cdots & h_{2k} \\ \vdots & \vdots & \vdots & \vdots & \vdots \\ h_2 & h_3 & \cdots & \cdots & h_{(k+2)} \\ h_1 & h_2 & \cdots & \cdots & h_{(k+1)} \end{bmatrix},$$

for any $(2k+1) \geq i > (k+1)$, the $h_{(i)} \ldots h_{(2k+2)}$ are equal to 0.

* * * * *